United States Patent
Luo et al.

(10) Patent No.: US 10,982,617 B2
(45) Date of Patent: Apr. 20, 2021

(54) SPLIT DIRECT INJECTION FOR REACTIVATED CYLINDERS OF AN INTERNAL COMBUSTION ENGINE

(71) Applicant: Tula Technology, Inc., San Jose, CA (US)

(72) Inventors: Xi Luo, San Jose, CA (US); Jerry F. Fuschetto, Bay Point, CA (US); Xin Yuan, Palo Alto, CA (US); Matthew A. Younkins, Campbell, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/552,052

(22) Filed: Aug. 27, 2019

(65) Prior Publication Data
US 2020/0072152 A1 Mar. 5, 2020

Related U.S. Application Data

(60) Provisional application No. 62/724,153, filed on Aug. 29, 2018.

(51) Int. Cl.
*F02D 41/30* (2006.01)
*F02D 41/40* (2006.01)
*F02D 41/38* (2006.01)

(52) U.S. Cl.
CPC ....... *F02D 41/3094* (2013.01); *F02D 41/402* (2013.01); *F02D 2041/389* (2013.01); *F02D 2200/021* (2013.01)

(58) Field of Classification Search
CPC ............... F02D 41/3094; F02D 41/402; F02D 2041/389; F02D 2200/021

USPC ......................................................... 123/431
See application file for complete search history.

(56) References Cited

U.S. PATENT DOCUMENTS

| | | | |
|---|---|---|---|
| 4,434,767 A | 3/1984 | Kohama et al. | |
| 4,489,695 A | 12/1984 | Kohama et al. | |
| 4,509,488 A | 4/1985 | Forster et al. | |
| 5,377,631 A | 1/1995 | Schechter et al. | |
| 6,158,411 A | 12/2000 | Morikawa | |
| 6,619,258 B2 | 9/2003 | McKay et al. | |
| 7,063,062 B2 | 6/2006 | Lewis et al. | |

(Continued)

FOREIGN PATENT DOCUMENTS

| | | |
|---|---|---|
| JP | 2016-094826 | 5/1916 |
| WO | WO 2010/006311 | 1/2010 |
| WO | WO 2011/085383 | 7/2011 |

OTHER PUBLICATIONS

Raza et al., "A Review of Particulate Number (PN) Emissions from Gasoline Direct Injection (GDI) Engines and Their Control Techniques", www.mdpi.com/journal/energies, Energies 2018, 11, 1417, doi: 10.3390/en11061417, Jun. 1, 2018, 26 pages.

(Continued)

*Primary Examiner* — Joseph J Dallo
*Assistant Examiner* — Yi-Kai Wang
(74) *Attorney, Agent, or Firm* — Beyer Law Group LLP

(57) ABSTRACT

A vehicle, engine controller and method for coordinating direct split injection of two or more pulses of fuel during a working cycle of a reactivated cylinder which was deactivated in a previous working cycle is described. By using split injection for the reactivated cylinder, the particulate matter and particulate number ("PM/PN") generated by the reactivated cylinder is reduced.

33 Claims, 10 Drawing Sheets

(56) References Cited

U.S. PATENT DOCUMENTS

| | | |
|---|---|---|
| 7,066,136 B2 | 6/2006 | Ogiso |
| 7,086,386 B2 | 8/2006 | Doering |
| 7,503,312 B2 | 3/2009 | Surnilla et al. |
| 7,577,511 B1 | 8/2009 | Tripathi et al. |
| 7,930,087 B2 | 4/2011 | Gibson et al. |
| 8,099,224 B2 | 1/2012 | Tripathi et al. |
| 9,086,020 B2 | 7/2015 | Tripathi et al. |
| 9,399,964 B2 | 7/2016 | Younkins et al. |
| 9,541,050 B2 | 1/2017 | Tripathi et al. |
| 9,982,624 B1 | 5/2018 | Kang et al. |
| 10,323,588 B2 | 6/2019 | VanDerWege |
| 2010/0050993 A1 | 3/2010 | Zhao et al. |
| 2014/0157760 A1* | 6/2014 | Tufail ................ F02D 41/0275 60/274 |
| 2014/0278007 A1* | 9/2014 | Wilcutts ............. F02D 41/3058 701/104 |
| 2015/0345407 A1* | 12/2015 | Glugla ................ F02D 41/345 123/403 |
| 2016/0040614 A1* | 2/2016 | Younkins ........... F02D 13/0269 123/335 |
| 2016/0115878 A1* | 4/2016 | VanDerWege ...... F02D 41/0087 123/333 |
| 2016/0356228 A1* | 12/2016 | Liu ...................... F02D 41/402 |
| 2017/0030278 A1* | 2/2017 | Phillips .............. F02D 41/0087 |
| 2017/0356380 A1* | 12/2017 | Surnilla ............... F02D 41/123 |
| 2020/0347757 A1* | 11/2020 | Lundgren ............... F01L 9/16 |

OTHER PUBLICATIONS

International Search Report and Written Opinion dated Dec. 4, 2019 from International Application No. PCT/US2019/047638.

* cited by examiner

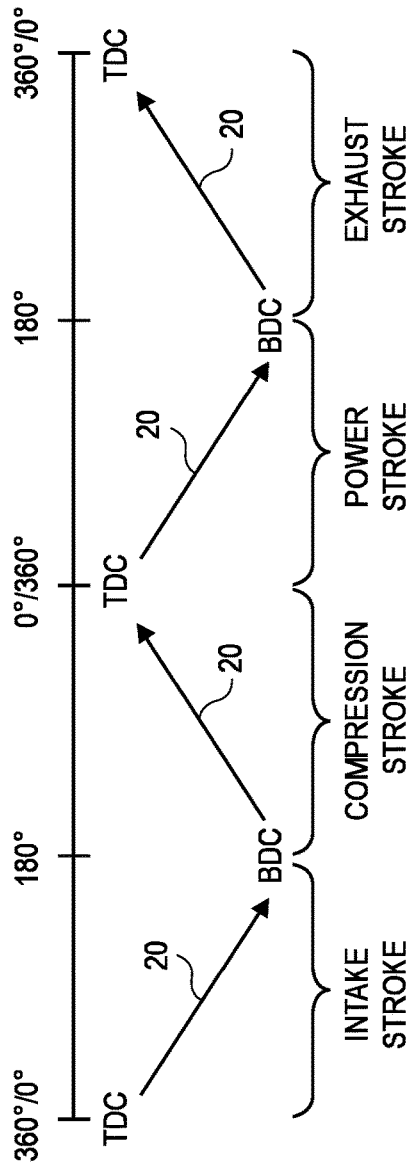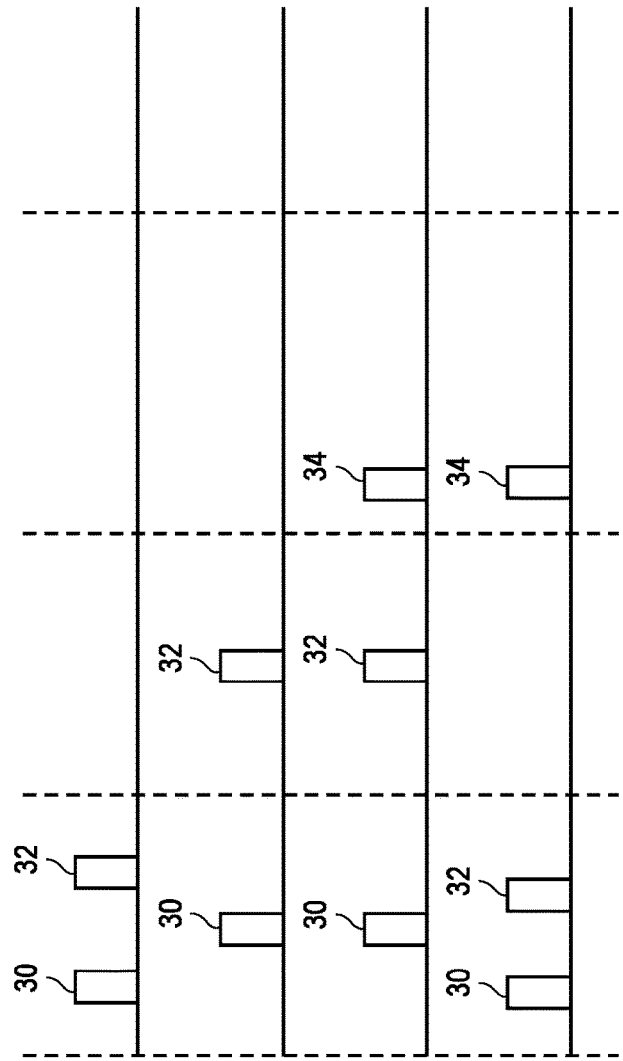

SPLIT DIRECT INJECTION FOR REACTIVATED CYLINDERS OF AN INTERNAL COMBUSTION ENGINE

CROSS-REFERENCE TO RELATED APPLICATIONS

This application claims priority of U.S. Provisional Application No. 62/724,153, entitled "Particulate Matter and Number Reduction Using Split Injection With Cylinder Deactivation" filed on Aug. 29, 2018, which is incorporated herein by reference in its entirety for all purposes.

BACKGROUND

The present invention relates generally to operation of an internal combustion engine, and more particularly, to reducing particulate matter and particulate number ("PM/PN") emissions by direct injection of two or more relatively small pulses of fuel, as opposed to one larger pulse of fuel, during a working cycle of a reactivated cylinder that was deactivated during one or more immediately prior working cycles.

Most vehicles in operation today are powered by internal combustion engines. Internal combustion engines have one or more cylinders where combustion occurs. Under normal driving conditions, the torque generated by the internal combustion engine needs to vary over a wide operating range in order to meet the demands of the driver and driving conditions.

The fuel efficiency of many types of internal combustion engines can be substantially improved by dynamically varying the displacement of the engine. With dynamic displacement, the engine can generate full displacement when needed, but also operate at a smaller displacement when full torque is not required, typically resulting in improved fuel efficiency.

The most common method of varying the displacement is deactivating one or more groups of cylinders. For example, with an eight-cylinder engine, groups of two, four, or six cylinders may be selectively deactivated as needed to meet varying torque demands. With this approach, no fuel is delivered to the deactivated cylinders and their associated intake and exhaust valves are closed to prevent pumping losses. The deactivation of cylinders thus results in improved fuel efficiency, while the remaining active cylinders generate the needed output to meet the current torque demand.

Most modern internal combustion engines, particularly those that are used by vehicles such as automobiles and trucks, rely on fuel injection for delivery of fuel to the cylinders. Two types of fuel injection systems are common: indirect injection and direct injection.

With indirect injection, fuel is injected into the intake runner between the intake manifold and the cylinder where it mixes with air to create an air-fuel mixture. The air-fuel mixture is then inducted into the cylinder during the intake stroke when the intake valve is opened and the piston moves from Top Dead Center (TDC) to Bottom Dead Center (BDC), sucking in the air-fuel mixture.

With direct injection, fuel is injected directly into the cylinder. In general, direct injection offers increased fuel efficiency and higher power output because the amount and timing of the delivery of the fuel into the cylinder can be more precisely controlled compared to indirect injection.

Split injection is a known variation of direct injection. With split injection, two, or potentially more, pulses of fuel are directly injected into a cylinder during a given working cycle. Split injection is typically employed to reduce emissions during a cold start and to mitigate knock at high loads. Split injection is currently used with conventional internal combustion engines where all cylinders are fired. To the best knowledge of the Applicants, split injection is not used with internal combustion engines where not all firing opportunities result in a cylinder firing, i.e. the cylinder is skipped or deactivated rather than fired. Such engine types include variable displacement engines where one or more fixed group(s) of cylinders are deactivated or skip fire-controlled engines where at least some of the engine's cylinders may be deactivated or fired on any given firing opportunity in response to the engine torque demand.

SUMMARY

The present application is directed toward a vehicle, engine controller, and method for coordinating split injection of two or more pulses of fuel into a cylinder during a working cycle of a reactivated cylinder which was deactivated in a previous working cycle. By using split injection for the reactivated cylinder, the PM/PN generated by the reactivated cylinder is reduced.

In various embodiments, the decision to directly inject the two or more pulses of fuel during the active working cycle of the reactivated cylinder is made based on one of the following:

(a) The firing history of the cylinder. Each time a cylinder is skipped, it cools. By using a predictive algorithm, the operating temperature of a cylinder can be determined to a very high degree of accuracy by considering the number of times the cylinder was either fired or skipped over the course of a predetermined number of previous working cycles. If the determined temperature of a cylinder is below a threshold, then a decision can be made to use split injection. If the determined temperature is above the threshold, then single pulse injection is used;

(b) Measuring the actual temperature of the cylinder using a temperature sensor and making the decision to use either single or split direct injection depending on if the measured temperature is above or below the threshold; or (c) A combination of (a) and (b).

In yet other embodiments, the vehicle, engine controller, and method may be used with any type of internal combustion engine where a firing opportunity is skipped or deactivated. Examples may include, but are not limited to, the following:

(a) Internal combustion engines where a group of one or more cylinders are deactivated to meet varying torque demands;

(b) Dynamically controlled skip fire internal combustion engines where the decision to fire or skip each cylinder is made on a firing opportunity by firing opportunity basis; and/or (c) Dynamic, multi-level, skip fire internal combustion engines wherein the output of fired cylinders is selected from one of several different output levels.

In yet other embodiments, a method of controlling direct fuel injection in an internal combustion engine is described. A cylinder in the engine operates so that the cylinder is skipped on some working cycles and fired on other working cycles. With the fired working cycles, a first subset uses a first fuel injection pattern to inject fuel into the cylinder and a second subset uses a second fuel injection pattern. The first fuel injection pattern may have fewer fuel pulses than the second injection pattern.

BRIEF DESCRIPTION OF THE DRAWINGS

The invention and the advantages thereof, may best be understood by reference to the following description taken in conjunction with the accompanying drawings in which:

FIG. 3A illustrates a working cycle of a cylinder.

FIGS. 3B-3E illustrate direct injection of two or more pulses of fuel during a given working cycle of the cylinder in accordance with various embodiments of the present invention.

In the drawings, like reference numerals are sometimes used to designate like structural elements. It should also be appreciated that the depictions in the figures are diagrammatic and not to scale.

DETAILED DESCRIPTION

Figure 1:
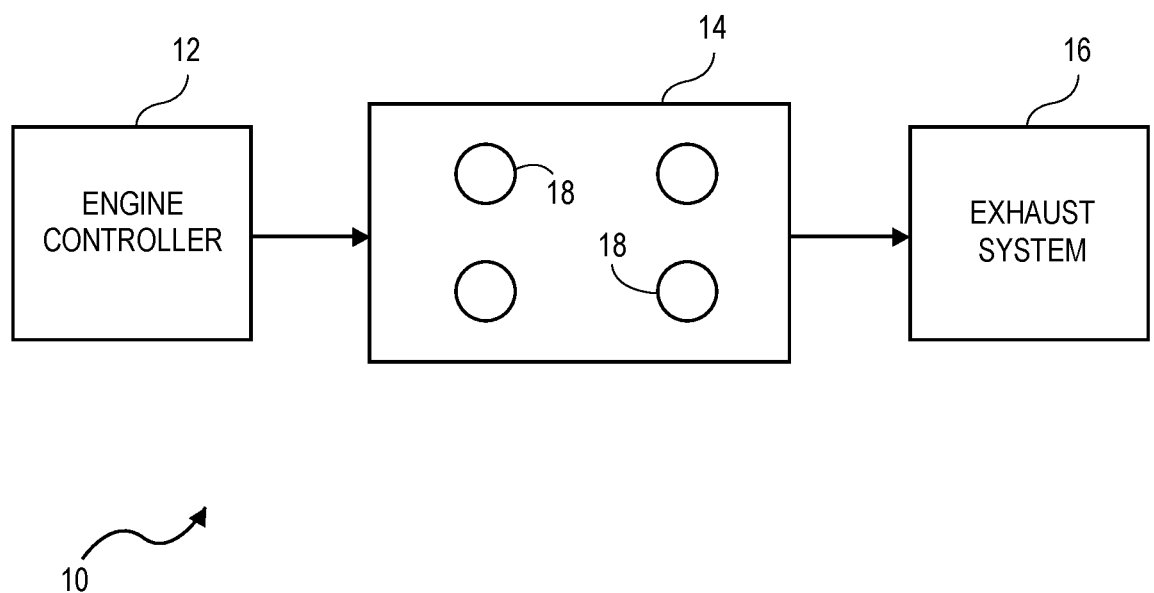
FIG. 1 is a logic diagram of an engine controller, internal combustion engine, and exhaust system of an exemplary vehicle in accordance with a non-exclusive embodiment of the present invention.

The present application is directed toward selective split direct injection of two or more pulses of fuel into an active working cycle of a reactivated cylinder that was deactivated during one or more immediately prior working cycles. The present application is thus suitable for any internal combustion engine where cylinders are selectively deactivated.

Dynamic Skip Fire (DSF)

DSF engine control contemplates selectively skipping the firing of certain cylinders during selected firing opportunities. As a result, for a given effective reduced displacement, a particular cylinder may be fired, skipped and then either fired or skipped over consecutive working cycles. From an engine cycle perspective, sequential engine cycles may have different cylinders fired and skipped while the engine is operating at the same firing fraction or firing density. In contrast, with variable displacement engine control one group of cylinders is continually fired, while another group of cylinders is continually skipped, for a given reduced effective displacement.

DSF engine control facilitates significantly finer control of the effective displacement of an engine than is possible using a conventional variable displacement approach. With DSF for example, firing every third cylinder in a 4-cylinder engine would provide an effective displacement of $\frac{1}{3}^{rd}$ of the full engine displacement. In the same 4-cylinder engine, the same $\frac{1}{3}^{rd}$ effective displacement is not obtainable by simply deactivating a group of one or more cylinders.

Conceptually, virtually any effective displacement can be obtained using DSF control, although in most practical implementations operation is limited to a fixed set of available firing densities, sequences, or patterns. In certain implementations of DSF, firing decisions regarding whether to skip or fire a particular cylinder during a particular working cycle are made in real time. In other words, the decision is often made immediately prior to the start of the working cycle and often on an individual cylinder firing opportunity by firing opportunity basis.

With DSF implementations relying on a defined set of firing patterns or firing densities, each has a corresponding effective engine displacement. The set of firing patterns/densities that may be used for a particular internal combustion engine may widely vary, from limited (e.g. a hand full of fractions e.g., 1/4, 1/3, 1/2, 2/3 and 1) to those that use significantly more. By way of example of the latter, some skip fire controllers designed by the Applicant facilitate operation at any firing density having a firing fraction between zero (0) and one (1) having an integer denominator of nine (9) or less. Such a controller has a set of 29 potential firing fractions, specifically: 0, 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9, and 1.

Although 29 potential firing fractions may be possible, not all firing fractions are suitable for use in all circumstances. Rather, at any given time, there may be a much more limited subset of firing fractions that are capable of delivering the desired engine torque while satisfying suitable drivability and noise, vibration and harshness (NVH) constraints.

The Applicant has filed a number of patents describing various approaches to skip fire control. By way of example, U.S. Pat. Nos. 7,849,835; 7,886,715; 7,934,474; 8,099,224; 8,131,445; 8,131,447; 8,464,690; 8,616,181; 8,651,091; 8,839,766; 8,869,773; 9,020,735: 9,086,020; 9,120,478; 9,175,613; 9,200,575; 9,200,587; 9,291,106; 9,399,964 and others, describe a variety of engine controllers that make it practical to operate a wide variety of internal combustion engines in a skip fire operational mode. Each of these patents is incorporated herein by reference for all purposes.

Dynamic Multi-Level Skip Fire

Dynamic multi-level skip fire is a variation of DSF. With dynamic multi-level DSF, not only is a decision made to either skip or fire individual cylinders on a firing opportunity by firing opportunity basis, but also one of several possible output levels is also selected for each fired cylinder. By selectively using different air charges and/or fueling levels, the work output of individual cylinders can be controlled or modulated to have different output levels. Dynamic multi-charge level engine operation where individual working cycles are operated at different cylinder output levels may be applied to various types of engine control besides DSF, including engines where all cylinders are always fired or engines where banks of cylinders can be deactivated. By way of example, U.S. Pat. No. 9,399,964 describes various implementations of dynamic multi-level skip fire engine operation and is incorporated by reference herein for all purposes.

Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder firing opportunity by firing opportunity basis, and often immediately prior to each firing opportunity, before the corresponding working cycle begins.

Particulate Matter and Number ("PM/PN")

Direct injection engines are known to emit higher levels of PM/PN than indirect injection engines, mainly due to the relative degree of homogeneous mixing of air and fuel between the two. With indirect or port injection, the air and fuel are "pre-mixed" in the intake runner. Inside the cylinder, further mixing occurs. As a result, (1) a relatively homogeneous mixture of air and fuel is achieved in the cylinder and (2) very little, if any, liquid fuel impinges on the internal walls of the cylinder. On the other hand, with direct injection there is less opportunity for the air and fuel to thoroughly mix because no "pre-mixing" occurs in the intake runner. With less opportunity to mix, the air-fuel mixture tends to be (1) less homogeneous, meaning fuel-rich pockets and/or liquid fuel drops may be present in the cylinder at the on-set of combustion, and (2) there is a higher likelihood that liquid fuel will impinge on the walls of the cylinder.

When fuel impinges or "wets" the cylinder walls, a liquid film forms on the cylinder walls. When the liquid fuel is exposed to combustion temperatures, it carbonizes, rather than experiencing complete combustion, due to a lack of oxygen at the exposed fuel surface. These carbon deposits are then swept out of the cylinder as particulate PM/PN emissions during the exhaust stroke once the exhaust valve opens. For these reasons, direct injection engines tend to have relatively higher levels of PM/PN emission levels than their indirect injection counterparts.

Cylinder Deactivation and PM/PN

Cylinder deactivation, despite its fuel saving advantages, does have some drawbacks. When a cylinder is deactivated, it tends to cool. It has been found that if a cylinder has been deactivated for one or more consecutive working cycles, the operating temperature of the cylinder may drop below its ideal operating temperature range. Consequently, when the cylinder is reactivated, the cooler cylinder temperature will cause the spray of the injected fuel to have a longer spray penetration length, which means the fuel will travel farther within the cylinder as a liquid before vaporization.

Late vaporization of fuel tends to increase PM/PN emission for at least two reasons:

(1) The longer time it takes for the fuel to vaporize, the less opportunity the fuel has to mix with air. As a result, fuel rich pockets develop within the combustion chamber, which tend to generate higher levels of PM/PN emissions upon combustion compared to a more homogeneous air-fuel mixture; and (2) The longer liquid travel time may result in the fuel "wetting" or impinging the piston and internal walls of the cylinder. When this occurs, a liquid film forms on the surfaces, carbonizes, and is swept out of the cylinder during the exhaust stroke, as discussed above.

With DSF controlled internal combustion engines, the PM/PN emission issue is further exacerbated. For instance, if three cylinders of eight cylinders are deactivated (i.e., skipped) during an engine cycle, then the remaining five active cylinders are required to generate more torque output to meet the required demand as compared if all the cylinders are fired. To meet the increased demand, more fuel needs to be injected into the active cylinders than would be needed for all cylinder operation. With the injection of a larger fuel mass, wetting of the internal walls of cylinders is more likely to occur, potentially increasing PM/PN emissions.

For at least the reason explained above, DSF and multi-level DSF controlled engines tend to generate higher levels of PM/PN emissions than other types of engines having cylinder deactivation capabilities.

Direct Split Injection

The Applicant has discovered that if direct split injection is used for a reactivated cylinder, following one or more work cycles where the cylinder was deactivated, PM/PN emissions can be reduced. With split injection, two (or more) smaller pulses of fuel are injected into a given cylinder, as opposed to one larger pulse. With a relatively smaller volume of fuel with each injection, the spray penetration length is shorter, which provides the advantages of (1) allowing the fuel to vaporize sooner, improving homogeneity of the air-fuel mixture and (2) reducing the possibility of fuel impinging or wetting the walls of the cylinder. As a result, PM/PN emissions are reduced. It is noted that the total fuel mass of the two or more smaller fuel pulses is typically equivalent to the fuel mass of the larger single fuel pulse. However, this is not necessarily a requirement.

Cylinder Thermal Characteristics

The thermal characteristics of cylinders may vary from one internal combustion engine to the next. With some internal combustion engines, the deactivation of one working cycle (i.e., a firing opportunity) may not drastically cool the operating temperature of the cylinder. In which case, implementing direct split injection for a reactivated cylinder, immediately following the skipped or inactive working cycle, may not be desirable or necessary for the purpose of reducing PM/PN emissions. On the other hand, if the same cylinder is deactivated multiple times over several immediately prior working cycles, then the cylinder may significantly cool to the point where implementing direct split injection is desirable upon reactivation. With other internal combustion engines, deactivation of a cylinder for just one working cycle may result in sufficient cooling, whereby split direct injection is desirable or necessary to reduce PM/PN emissions upon reactivation during the next working cycle. Thus, depending on the details of the engine design, split injection may be used for reactivated cylinders following one skip, two successive skips, three successive skips, four successive skips, or any larger number of successive skips.

Conversely, the number of consecutive active work cycles in which a "cold" cylinder needs to heat up to a normal operating temperature range may also widely vary. With some internal combustion engines, a single actively fired working cycle may suffice. With other internal combustion engines, two or more actively fired working cycles may be needed for a "cold" cylinder to heat up to its normal or warm operating temperature range, which is above a threshold where split injection is desirable.

The "warm" or normal operating temperature range of a cylinder may also widely vary from one internal combustion engine to the next. Generally, the warm operating temperature of the internal walls of a cylinder may range from around 150° to 175° C. and the head of the piston may range from 225° C. to 255° C. For boosted internal combustion engines, these ranges may be higher, for example, up to 300° C. It should be understood that these ranges are merely exemplary and should not be construed as limiting in any regard. In actual embodiments of various internal combustion engines, temperatures that may be considered "cold" or "warm" may widely vary.

Exemplary Embodiments

Referring to FIG. 1, a logic diagram 10 of an engine controller 12, internal combustion engine 14 and exhaust system 16 of an exemplary vehicle is shown. The internal combustion engine 14 includes a plurality of cylinders 18. In the embodiment illustrated, the internal combustion engine 14 includes 4 cylinders. It should be understood that this number may widely vary. In other embodiments, the number of cylinders 18 may range from, for example, 1, 2, 3, 5, 6, 8, 12, 16 or more. The cylinders may be arranged in banks or may be in an in-line configuration.

The engine controller 12 is arranged to operate the internal combustion engine 14 in any manner where at least one of the cylinders may be selectively deactivated (i.e., skipped) during a given work cycle. For instance, in various alternative embodiments, the engine controller 12 may operate (a) to selectively deactivate a group of one or more cylinders, (b) as a DSF engine controller wherein a decision to fire or skip each cylinder 18 is made on a firing opportunity by firing opportunity basis or (c) as a dynamic, multi-level, skip fire internal combustion engine wherein the output of fired cylinder(s) 18 is selected from one of several different possible output levels.

The internal combustion engine 14 may also be either spark ignition or compression ignition. With the former, a spark generated by a spark plug or the like prior to or at the beginning of the power stroke of each cylinder 18, is used to ignite the air-fuel mixture. With the latter, ignition is initiated by a combination of pressure and elevated temperature near the end of the compression stroke.

The exhaust system 16 is provided to limit emissions of undesirable pollutants, including PM/PN emission, that are a byproduct of combustion. The components in the exhaust 16 may vary depending on the type of internal combustion engine. With spark ignition gasoline engines, the exhaust system 16 typically includes a 3-way catalyst that both oxidizes unburned hydrocarbons and carbon monoxide and reduces nitrous oxides ($NO_x$). These catalysts require that on average the engine combustion be at or near a stoichiometric air/fuel ratio, so that both oxidation and reduction reactions can occur. Compression ignition engines generally run lean. Consequently, compression ignition engines, such as Diesel engines, cannot rely on a conventional 3-way catalyst to meet emissions regulations. Instead, they use other types of aftertreatment devices to reduce $NO_x$ emissions. These aftertreatment devices may use a combination of lean $NO_x$ traps and selective catalyst reduction (SCR) to reduce nitrous oxides to molecular nitrogen. Additionally, compression ignition engines may also use or require a particulate filter to reduce soot emissions. In various embodiments, the exhaust system 16 may include any combination of one or more of the above-listed aftertreatment elements.

The cylinders 18, regardless of the number, are configured to generate a torque output during active ("fired") work cycles. In various embodiments, the internal combustion engine 14 may be any numbered stroke engine, for example, either a 4-stroke or a 2-stroke engine.

Direct Injection

Figure 2:
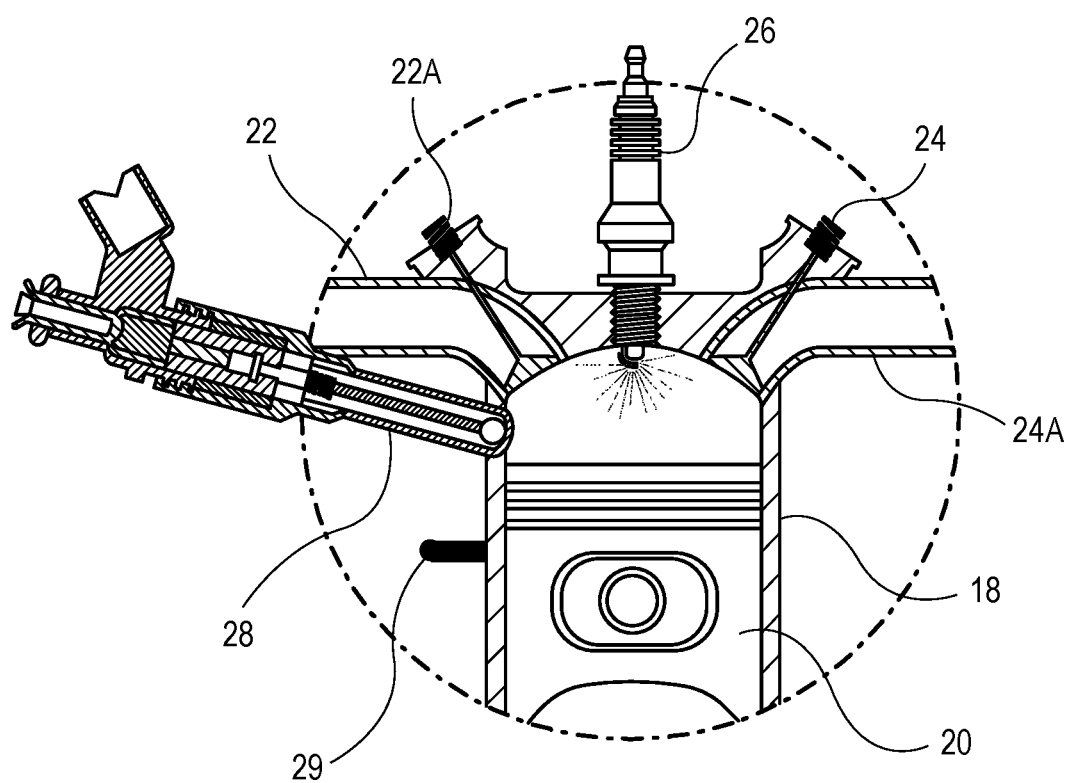
FIG. 2 illustrates an exemplary cylinder of an internal combustion engine that uses direct injection in accordance with the present invention.

Referring to FIG. 2, a cross section of an exemplary cylinder 18 with direct injection is illustrated. The cylinder 18 includes a piston 20, air intake runner 22, an intake valve 22A, an exhaust valve 24, an exhaust runner 24A, a spark plug 26 and a direct fuel injection element 28.

During a working cycle, the piston 20 reciprocates between positions that are commonly referred to as Top Dead Center (TDC) and Bottom Dead Center (BDC).

The air intake runner 22 supplies air to the cylinder 18 when intake valve 22A is opened.

The exhaust valve 24, when opened, allows combustion gases and other particulate matter to be exhausted from the cylinder 18 through the exhaust runner 24A to the exhaust system 16 (not illustrated).

The spark plug 26 generates a spark that ignites the air-fuel mixture in the cylinder 18.

The direct fuel injection element 28 is arranged to inject fuel directly into the cylinder 18. As described in more detail below, the direct injection element 28 is capable of injecting a single relatively large pulse of fuel, or alternatively, two or more smaller pulses during one or more strokes of any given working cycle.

In the example shown, the cylinder 18 is spark ignited. If the cylinder 18 relied on compression ignition, it would essentially be the same as illustrated, but without the spark plug 26.

In an optional embodiment, a temperature sensor 29 may be provided on or near the cylinder 18 for measuring its operational temperature.

Although split direct injection as described below can be used with any internal combustion engine regardless of the number of strokes, the following explanation is only described in the context of a 4-stroke engine for the sake of brevity.

Referring to FIG. 3A, a working cycle of a cylinder 18 of a 4-stroke internal combustion engine 14 is illustrated. In this particular example, the 4-strokes include an intake stroke, a compression stroke, a power stroke and an exhaust stroke. All four strokes are completed in two revolutions of the crankshaft, or a total of 720 degrees of crankshaft rotation.

As is described in more detail below, the direct fuel injection element 28 may inject fuel during the intake and also possibly the compression and/or power strokes. Fuel injection during the intake stroke allows maximum time for fuel-air mixing.

During the working cycle, a given cylinder 18 operates as follows:

In the intake stroke, the intake valve 22A is opened and the piston 20 moves from TDC to BDC, resulting in air being inducted into the chamber from the air intake runner 22. The air mixes with the fuel injected by the fuel injection element 28;

In the compression stroke, the intake valve 22A is closed, and the piston moves from BDC to TDC, compressing the air-fuel mixture in the cylinder, near the end of the compression stroke the spark plug 26 generates a spark, causing the compressed air-fuel mixture to combust;

In the power stroke, the combustion front propagates throughout the enclosed cylinder volume generating a large increase in temperature and pressure of the trapped gas. As a result, the piston moves from the TDC to BDC position and the cylinder generates a torque output or work.

In the exhaust stroke, the exhaust valve 24 is opened and the piston moves from BDC to TDC, forcing out the by-products of combustion, including gases, particulates, and other pollutants, through the exhaust runner 24A and into the exhaust system 16.

Once a given work cycle is complete, the piston 20 is again at the TDC position and the cylinder is ready to begin its next working cycle.

With split injection, the direct fuel injection element 28 is arranged to inject two or more relatively small pulses of fuel during one or more of the intake, compression, and/or power strokes of the working cycle. Referring to FIG. 3B though FIG. 3E, diagrams of several alternative embodiments are illustrated. In particular:

FIG. 3B illustrates a first pulse 30 and a second pulse 32, both injected during the intake stroke.

FIG. 3C illustrates a first pulse 30 during the intake stroke and a second pulse 32 during the compression stroke.

FIG. 3D illustrates first, second and third pulses 30, 32 and 34 in the intake, compression and power strokes, respectively.

FIG. 3E illustrates first and second pulses 30 and 32 in the intake stroke, and a third pulse 34 in the power stroke.

The latter two examples, with the direct injection of a fuel pulse in the power stroke, is more applicable for lean burn compression ignition engines. With these types of engines, excess particulates and CO may remain in the cylinder following combustion. By injecting a small amount of fuel during the power stroke, these particulates and CO may be burned off prior to the exhaust stroke, lowering PM/PN and CO emissions.

The duration of the fuel pulses depicted in FIGS. 3B to 3E are shown as being equal in length, but this is not a requirement. The duration of each fuel pulse in split injection may be different.

It should be appreciated that the distribution of fuel pulses is not limited to those explicitly depicted in FIGS. 3B to 3E. Two or more pulses can be injected in any stroke, or combination of strokes. Any number of fuel pulses of different pulse durations may be distributed among the different strokes of a cylinder working cycle.

Pulse Width and Fuel Injection Pressure

The fuel spray penetration length of a pulse directly injected into a cylinder is critical in providing ideal air-fuel mixing and for limiting PM/PN emissions as described above. The fuel spray penetration length, for any pulse, can be optimized by controlling at least two parameters, including (1) the duration or width of a fuel pulse and (2) the pressure at which the fuel is injected into the cylinder.

The size and other characteristics of cylinders 18 may vary from one internal combustion engine to the next. An ideal fuel spray penetration length for one engine may be inadequate for another internal combustion engine. By adjusting the pulse width and pressure parameters, a desired spray penetration length can be achieved for a wide variety of engines. For example, with some engines, an optimized fuel spray penetration may be achieved using a longer pulse width injected at low pressure. With other engines, the optimized fuel spray penetration length may be achieved with a shorter pulse width at high pressure.

Figure 4A:
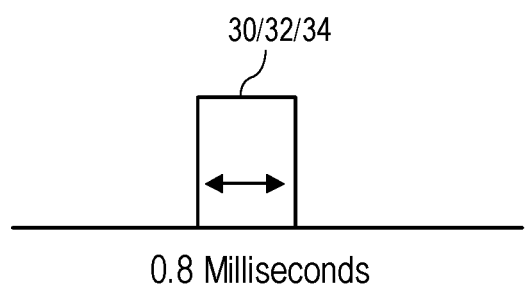
FIGS. 4A-4B illustrate various examples of one or more directly injected pulse(s) of fuel during a working cycle in accordance with various non-exclusive embodiments of the invention.
Figure 4B:

With split injection, the desired fuel spray penetration length for each pulse can thus be individually controlled by selecting the injection pulse width and optionally adjusting the fuel rail pressure. FIGS. 4A-4B illustrate various examples of directly injected pulses of fuel in accordance with non-exclusive embodiments. In each case, a different spray penetration length is realized.

In FIG. 4A, a fuel pulse (any of first, second or third pulses 30, 32 or 34) is approximately 0.8 milliseconds in duration and is delivered with a fuel rail pressure of 340 bar. The Applicant has found that with a certain internal combustion engine (e.g. a 4-cylinder, 4-stroke Volkswagen turbocharged gasoline direct injected (T-GDI) engine) this combination of pulse duration and pressure provides the desired fuel spray penetration length. By comparison the stroke duration for the engine operating at 1600 rpm is 18.75 milliseconds, so the fuel pulse duration is only a small, less than 5%, of the stroke duration. It should be understood that this pulse width and pressure combination is merely exemplary and should not be construed as limiting in any regard. For different internal combustion engines, pulses that are shorter or longer in duration, and injected at pressures that are either higher or lower, may be used.

In FIG. 4B, two exemplary pulses are illustrated. In this example, the first pulse 30 has a longer duration than the second pulse 32 (and possibly the third pulse 34). This example illustrates that by using pulses having different widths and/or pressure, the resulting fuel spray penetration length for each may be different. In other words, for each injected fuel pulse during a working cycle having multiple fuel injections, there is no requirement that the individual pulses have the same duration.

Single vs. Split Injection Control

The engine controller 12 is responsible for (1) determining which cylinders 18, in their firing order, should be activated (i.e., fired) or deactivated (e.g., skipped), (2) for activated cylinders, determining if single or split injection should be used and (3) managing direct fuel injection element 28 to control the timing and duration of the fuel pulses 30, 32 and/or 34 to achieve the desired total injected fuel mass and fuel spray penetration length for each.

As noted above, direct injection into a "cold" cylinder 18 may be problematic because of increased PM/PN emissions. On the other hand, using split injection all the time, for all active firing opportunities, also has its drawbacks. The constant use of split injection (1) wears out the fuel injector element 28, and (2) offers less precise or accurate fuel delivery compared to a single large pulse.

During operation of the engine 14, the temperature of a given cylinder 18 will fluctuate between "cold" and "warm" temperatures, depending on its firing history (i.e. the pattern of fires and skips over the immediately past few firing opportunities). The decision to use single or split injection is largely dependent on the operating temperature of the cylinder just prior to it being fired. If "cold" then split injection preferably is used. If "warm", then single injection preferably is used. In various embodiments, the temperature of the cylinder is determined using one of the following:

(1) By using an algorithm that predicts the temperature based on the firing history of the cylinder over the past several firing opportunities (e.g., past 1-5 firing opportunities or some alternative history length). As previously noted, the degree to which a cylinder cools following one or more skips, or heats following one or more firings, may widely vary from engine to engine. By tailoring the algorithm used with a particular engine and/or vehicle, the actual temperature of the cylinders can typically be predicted or determined to a very high level of accuracy. With the predicted temperature, a decision to use single or split injection can readily be made. If the predicted temperature is below a temperature threshold, then split injection is used. If the predicted temperature is above the temperature threshold, then single pulse injection is used;

(2) Measuring the actual temperature of the cylinder using the temperature sensor 29 and making the decision to use either single or split injection depending on if the measured temperature is above or below the threshold; or (3) A combination of (1) and (2).

Figure 5:
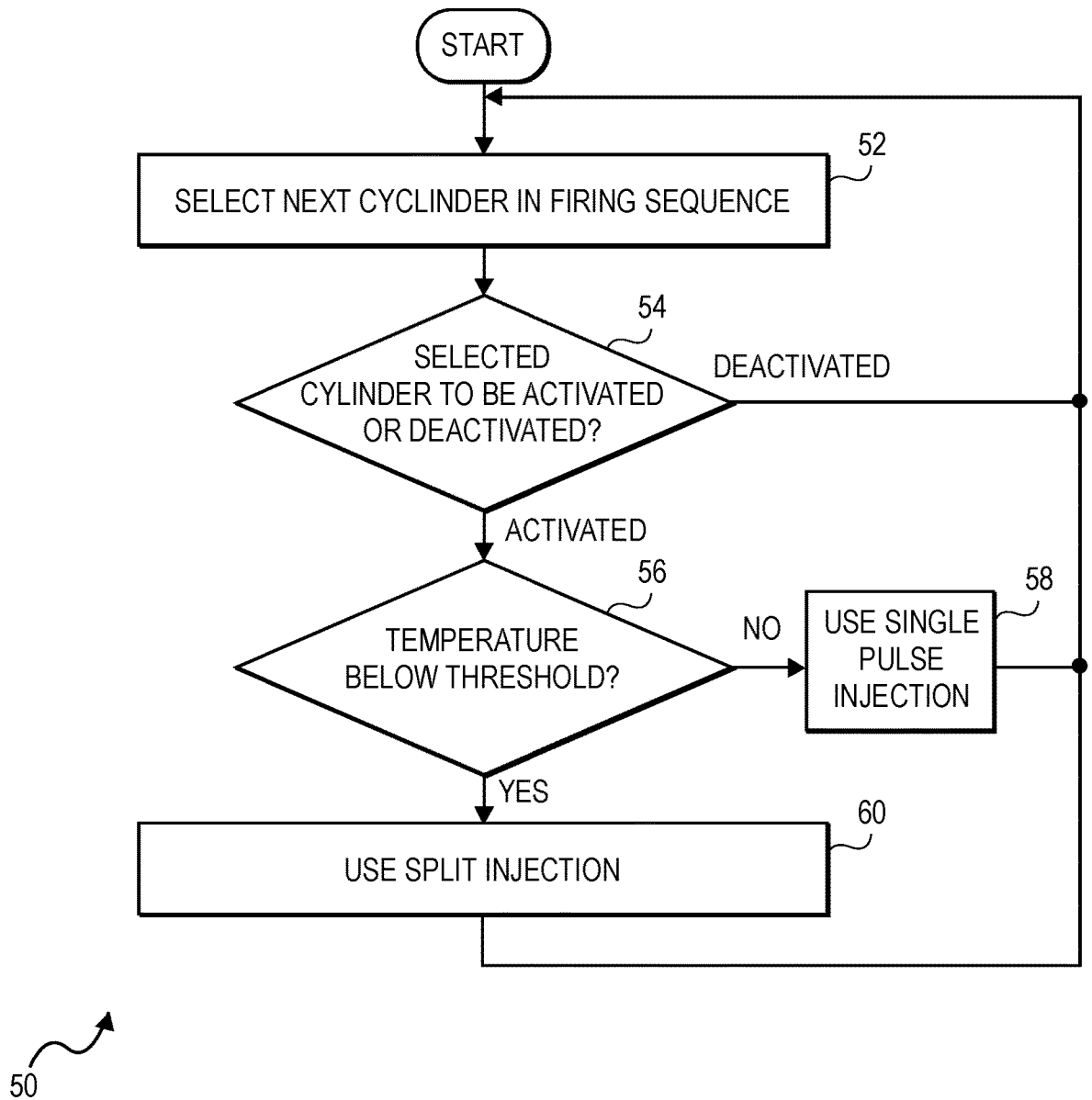
FIG. 5 illustrates a flow chart of steps for switching a cylinder operation between multi-pulse and single pulse direct injection in accordance with a non-exclusive embodiment of the invention.

Referring to FIG. 5, a flow chart 50 illustrating steps implemented by the engine controller 12 for deciding whether to use single or split injection for the cylinders 18 of the internal combustion engine 14 is illustrated.

In the initial step 52, the engine controller 12 selects the next cylinder 18 in the firing order of the internal combustion engine 14.

In step 54, the engine controller 12 determines if the selected cylinder 12 is to be activated or deactivated in the upcoming work cycle. If deactivated, then control is returned to step 52, where the next cylinder in the firing order is selected in due course. If the selected cylinder 18 is to be activated, then decision 56 is performed.

In decision 56, the temperature of the selected cylinder 18 is ascertained using any of the methods (1), (2) or (3) described above. Once the temperature is predicted, determined, and/or measured, it is then compared to a threshold temperature.

In step 58, the engine controller 12 makes a decision to use single pulse injection if the predicted, determined, and/or measured temperature is above the temperature threshold.

Alternatively, in step 60, the engine controller 12 makes a decision to use split injection if the predicted, determined, and/or measured temperature is below the temperature threshold. In such circumstances, the cylinder is "cold" and using split injection helps reduce the PM/PN emissions.

Regardless if single or split injection is used, control is returned to step 52 and the next cylinder in the firing order is selected and the steps 54-60 are repeated. The above process is continually repeated for each cylinder 18 in the firing order for each engine cycle respectively. In this manner, for each firing opportunity for each of the cylinders 18, the engine controller 12 makes a decision to (a) activate or deactivate the cylinder 18 and (b) for activated cycles, to use either single or split injection.

With the above approach, split injection is used only when needed (i.e., only when the cylinder is "cold"). As a given cylinder fluctuates in temperature, split injection is used only when "cold", but not when "warm". If a "cold" cylinder 18 is fired in successive firing opportunities, it will eventually heat up. When the temperature of the cylinder exceeds the threshold, then single injection will be used. Conversely, when a warm cylinder is skipped for one or more firing opportunities, it will likely cool to a temperature below the threshold. Upon reactivation of the cylinder, split injection is used until its temperature warms and exceeds the threshold.

The above-described approach offers a number of advantages, including (1) PM/PN and hydrocarbon emissions reductions when "cold" cylinders are fired, (2) reduced wear and tear on the injector element 28 because split injection is used only when needed, and (3) more precise fuel mass delivery to "warm" cylinders using single pulse injection.

Special Cases

Deceleration Cylinder Cut Off (DCCO) occurs in certain driving situations when the driver or other autonomous or semi-autonomous driving controller makes no torque demand (e.g., the accelerator pedal is not pressed), such as when a vehicle is coasting downhill or to a stop. In DCCO, the cylinders of the engine are typically not fueled and the intake and/or exhaust valves are closed. As a result, fuel is saved and pumping losses are reduced. Since the cylinders in DCCO operation are typically not fired over numerous consecutive firing opportunities, they tend to cool. Consequently, in the context of the present invention, the Applicant advocates in certain non-exclusive embodiments the use of split injection for all reactivated cylinders upon exit of DCCO operation and until the reactivated cylinders reach a "warm" temperature above a temperature threshold.

When a vehicle is idling, typically very little fuel is injected into the cylinders of the engine. Direct injection of a single pulse into the cylinders of an idling engine is, therefore, generally preferred because splitting very small amounts of fuel into two or more pulses is more challenging than injecting a single pulse when the vehicle is idling.

It may be advantageous to operate one or more cylinders 18 of the internal combustion engine 14 as one of several different forms of gas springs during working cycles where the one or more cylinders are deactivated. Such forms of gas springs may include, but are not limited to, a low pressure exhaust spring (LPES), a high pressure exhaust spring (HPES), or an air spring (AS). These gas spring types are described in U.S. patent application Ser. No. 15/982,406, which is incorporated herein by reference for all purposes. Depending on the type of gas spring used, the temperature evolution of a cylinder in response to fires and skips will differ. For example, a deactivated cylinder operating as a HPES will cool more slowly than a deactivated cylinder operating with an air spring. For a compression ignition engine, skipped working cycles may not be deactivated, that is the intake and exhaust valves may continue to open and close pumping air through the skipped working cycle. The skipped working cycle will have no fuel injected and thus will deliver no torque, i.e. it will be skipped. Pumping air through the cylinder will tend to cool the cylinder more rapidly than if gas is trapped in the cylinder combustion chamber using one of the gas spring trapping modes described above. With this in mind, any predictive algorithm that is used for determining single vs. split injection may take into account the different temperature cooling profile of the cylinders when operating with different types of gas springs or with working cycles that pump air.

As described previously, an engine may use dynamic firing level modulation engine control in which the output of each working cycle (e.g., skip/fire, high/low, skip/high/low, etc.) is dynamically determined during operation of the engine. The firing type may influence the injection pattern. The injected fuel mass for a low output firing opportunity will be less than the injected fuel mass for a high output firing opportunity. Thus, the total duration of fuel injection in an engine cycle will be less in a low output firing event than a high output firing event. A reactivated cylinder will heat more slowly if it operates with low output firing opportunities as compared with high output firing opportunities. Thus, different injection patterns may be used depending on whether the cylinder is operated at a low or high output level and on the cylinder firing history.

It should be appreciated that some engines; for example, lean burn engines, may routinely operate using split injection. For example, a Diesel engine may routinely use an injection pattern consisting of a pilot injection, a main injection, and multiple post injections. The pilot injection helps to reduce combustion noise. The main injection generates most of the torque associated with the cylinder firing. The one or more post injections typically generate little torque but may be used to increase the temperature of the exhaust gas to help limit emissions. For these engines, rather than simply using either single and split injection a different injection pattern may be used depending on the firing history or temperature of the cylinder. For example, a first fuel injection pattern may be used in some cases and a second fuel injection pattern in other cases. The first fuel injection pattern may have fewer fuel pulses than the second fuel injection pattern. The second fuel injection pattern may be used until a cylinder temperature threshold has been met.

PN/PN Experiment with Volkswagen T-GDI Engine and DSF

The effect on fuel consumption and particulate matter emissions of a 4-cylinder, 4-stroke, turbocharged, gasoline direct injected (T-GDI) engine operating with DSF engine control was investigated. It was found that optimized fuel injection strategies, including split pulse injection, for reactivated cylinders following deactivated working cycles, can substantially mitigate particulate emissions.

Engine Modifications

To demonstrate the effectiveness of DSF operation with a T-GDI engine, a Volkswagen 1.8-liter EA888 Gen. 3 turbocharged 4-cylinder engine was used. Some significant specifications for the engine are summarized in Table I below.

To demonstrate the effectiveness of DSF operation with a T-GDI engine, a Volkswagen 1.8-liter EA888 Gen. 3 turbocharged 4-cylinder engine was used. Some significant specifications for the engine are summarized in Table I below.

TABLE I

| | |
|---|---|
| Engine Displacement | 1798 cm$^3$ |
| Stroke | 84.1 mm |
| Bore | 82.5 mm |
| Connecting Rod | 148 mm |
| Compression Ratio | 9.6:1 |
| Valve train | 16-valve DOHC |
| Camshaft Phasing Authority | 60° CA, intake only |
| Intake Valve Open, Middle of Range | −373°ATDC @ 0.1 mm lift |
| Intake Valve Close, Middle of Range | −146°ATDC @ 0.1 mm lift |
| Exhaust Valve Open | 151°ATDC @ 0.1 mm lift |
| Exhaust Valve Close | 370°ATDC @ 0.1 mm lift |
| Deactivation system | DRFF with OCV |

In Table I DOHC is an abbreviation for a dual overhead cam, CA is an abbreviation for crankshaft angle, ATDC is an abbreviation for after top dead center, DRFF is an abbreviation for deactivating roller finger follower, and OCV is an abbreviation for oil control valve.

The engine was modified to operate with DSF and retrofitted with Delphi Technologies deactivating roller finger followers (DRFFs) on each valve and associated oil control valve (OCV) for each cylinder. The cylinder geometry and valve lift profiles were carried over from the original engine. A high-pressure (350 bar) Delphi direct injection system was used, replacing the stock direct injection system.

The fuel used in this study was a California Air Resources Board (CARB) Low-Emission Vehicle (LEV) III gasoline with anti-knock index (AKI) of 87. The engine was used to power a Volkswagen Jetta that was mounted on a dynamometer. Various engine input and output parameters were measured during the testing.

Firing Sequences

Firing density (FD) is used to describe the number of firing events out of total firing opportunities, also referred to as a firing fraction. Depending on the total number of cylinders, some FDs would have some engine cylinders skip continuously and other cylinders fire continuously. Those FDs are often referred to as fixed firing patterns, such as ½ and ¾ FD for a 4-cylinder engine. On the other hand, the rotating firing patterns, such as ⅓ and ⅔ FD for a 4-cylinder engine have engine cylinders switching between firing and skipping across cycles. A FD of 1 is considered a fixed firing pattern and is equivalent to all-cylinder mode.

Test Results and Analysis

Figure 6:
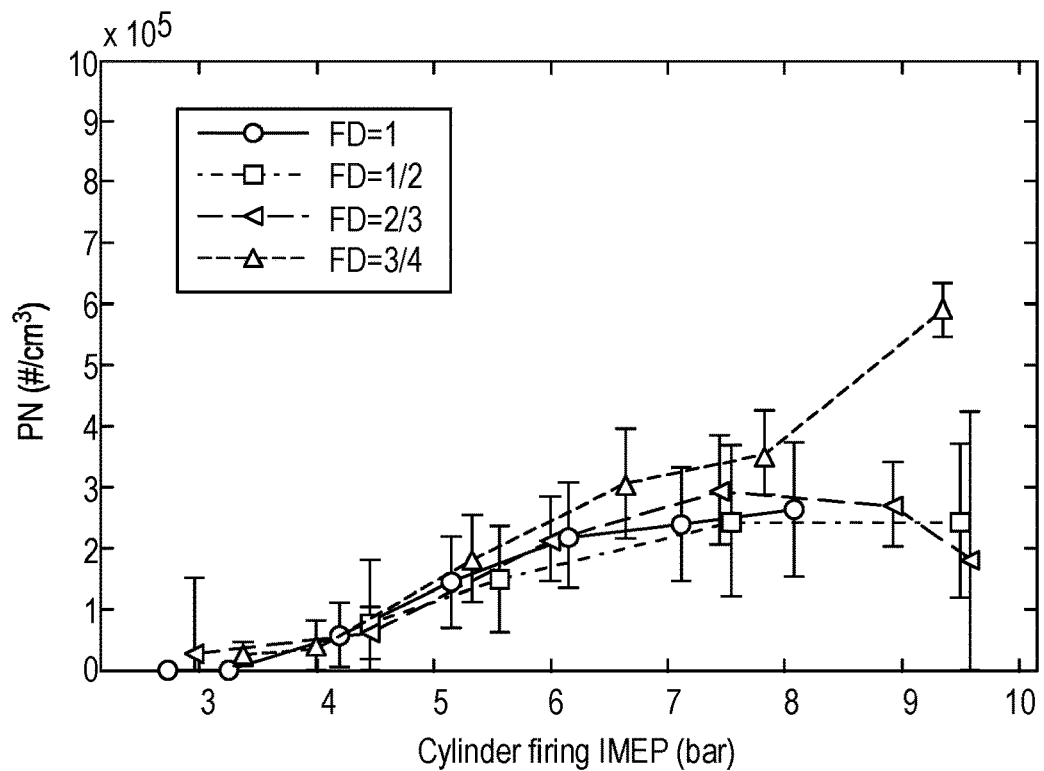
FIG. 6 is a plot of particulate emissions versus cylinder load for various firing densities with single fuel injection.

FIG. 6 shows PN measurement versus cylinder load for a variety of firing densities at 1600 rpm with single pulse fuel injection. As expected, PN emissions increase as cylinder load increases. Here, cylinder load is defined as cylinder firing Indicated Mean Effective Pressure (IMEP), the average IMEP of firing cylinders only. At a given cylinder load, the emitted PN of examined FDs were within measurement uncertainty of each other, apart from a ¾ FD at 9 bar IMEP, which is believed to be an erroneous data point. It is expected and observed that fixed firing patterns such as FD=½, ¾, and 1, which continuously fire the same cylinders, have a minimal effect on the PN emission relative to an all cylinder operation. However, for a rotating pattern such as FD=⅔, PN emission was equivalent to fixed patterns at a given cylinder IMEP, as shown in FIG. 6. For a firing density of ⅔, any given cylinder is fired during two consecutive working cycles and then skipped for a working cycle and then fired for two more consecutive working cycles. For this engine at this engine speed, this firing pattern having only a single isolated skip does not increase PM/PN emission.

Figure 7:
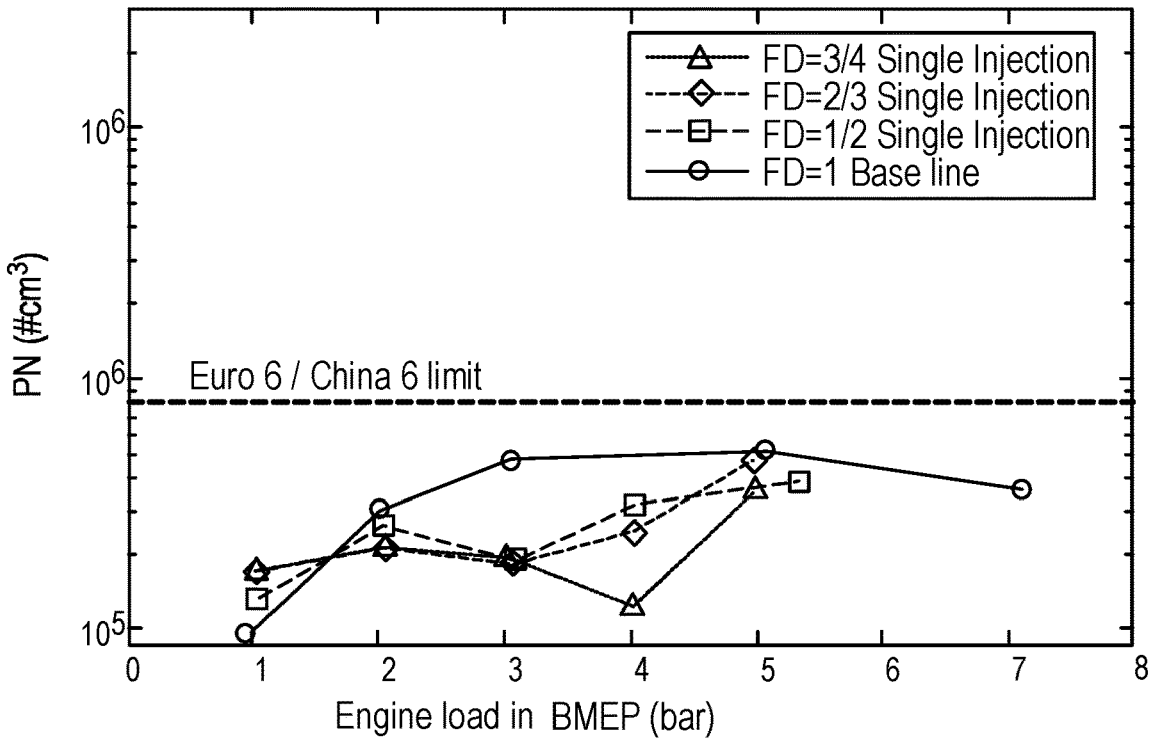
FIG. 7 is a plot of particulate emissions versus engine load for the same firing densities as shown in FIG. 6.

FIG. 7 shows some of the same data as shown in FIG. 6 but plotted with a different horizontal axis. In this figure the horizontal axis is the total engine load expressed as Brake Mean Effective Pressure (BMEP). Firing densities of ½, ⅔, and ¾ have less PN emission than a FD of 1 from 2 to 5 bar BMEP. Also shown in FIG. 7 is a horizontal line representing a regulatory PN emission limit. This limit is based on the Euro 6c/China 6 standard of $6.0 \times 10^{11}$ particles/km for vehicles operating on the Worldwide Harmonized Light Vehicle Test (WLTP) drive cycle. We have calculated that this regulatory limit corresponds to a particulate emission level of approximately $8.5 \times 10^5$ (particles/cm$^3$) in the engine exhaust gas. Inspection of the figure illustrates that PN emissions are well below the regulatory limit for all these FDs at this engine speed.

Figure 8:
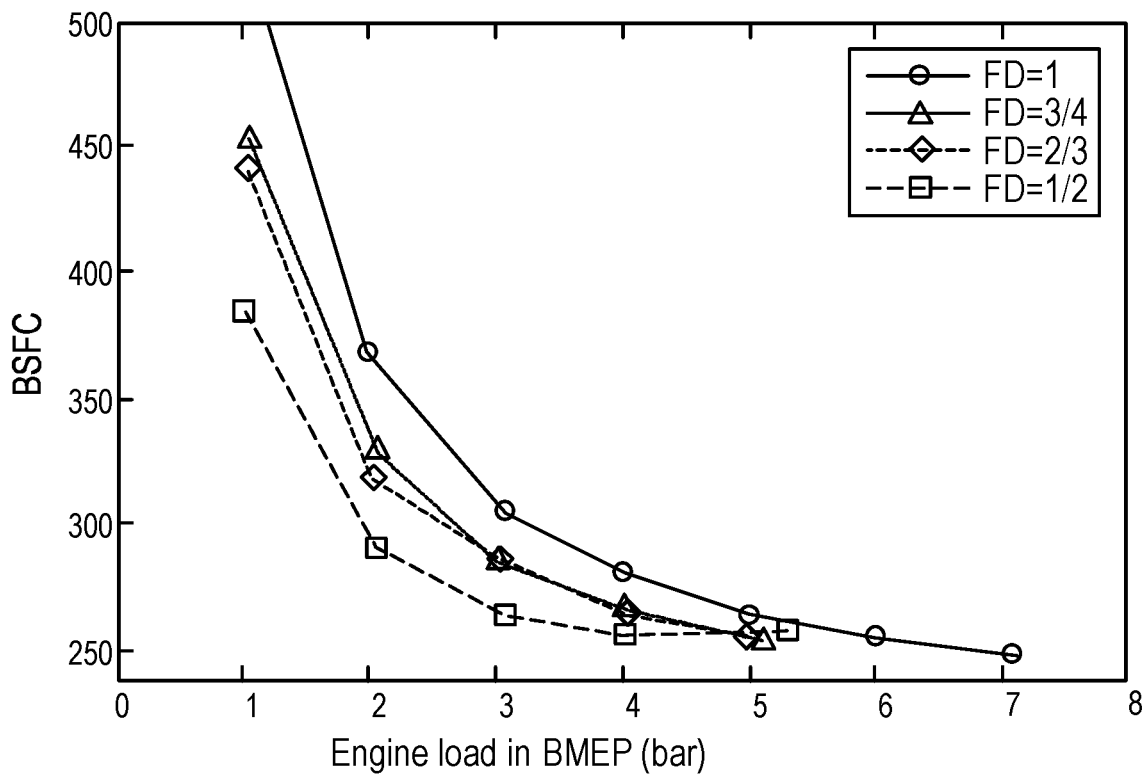
FIG. 8 is a plot of the brake specific fuel consumption (BSFC) versus engine load for the same firing densities as provided in FIG. 7.

FIG. 8 shows the brake specific fuel consumption (BSFC) versus engine load for the same firing densities as shown in FIG. 7. Inspection of the figure shows that the operation at a lower firing density increases fuel efficiency at low engine loads from approximately 1 to 5 bar BMEP. Thus, at lower engine loads, DSF can simultaneously reduced PN emissions and fuel consumption.

Figure 9:
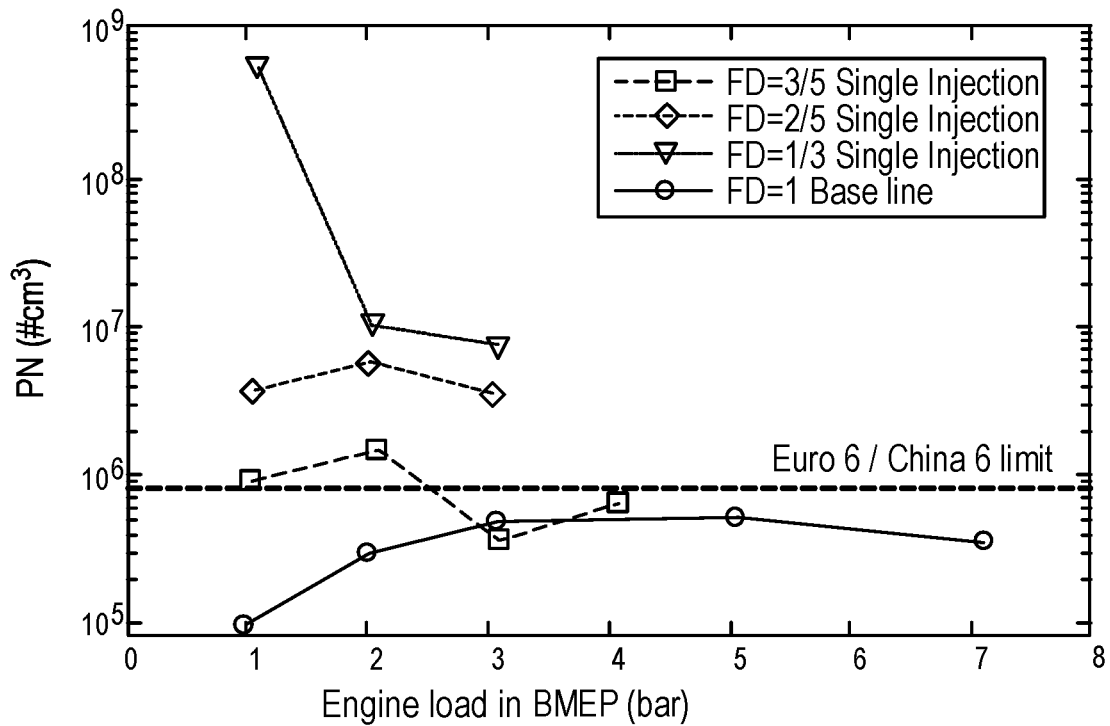
FIG. 9 is a plot of particulate emissions versus engine load for various firing densities having a rotating firing pattern and multiple consecutive skips with single fuel injection.

While most firing densities have less or equivalent levels of PN emission compared to all cylinder mode, certain rotating FDs of ⅓, ⅖, and ⅗ have higher PN emission as shown in FIG. 9, which shows PN emission at 1600 RPMs for various FDs with single pulse injection. A likely explanation for this behavior is when a given cylinder skips for two or more consecutive cycles lower cylinder temperatures can cause a poorly atomized fuel/air mixture that leads to higher PM/PN emissions. The cylinder wall and fuel injector tip temperature may have cooled down to the point where the fuel spray penetration length has significantly increased, and potential cylinder wall wetting can occur. A firing density of ⅓ exhibited the highest level of PN emission because every fire in that pattern occurs after two consecutive skips. A firing density of ⅖ exhibited slightly less PN than a FD of ⅓ because it features one fire after 2 skips and one fire after one skip. A FD of ⅗ showed the lowest PN of the three patterns since it does not have any consecutive skips.

Figure 10:
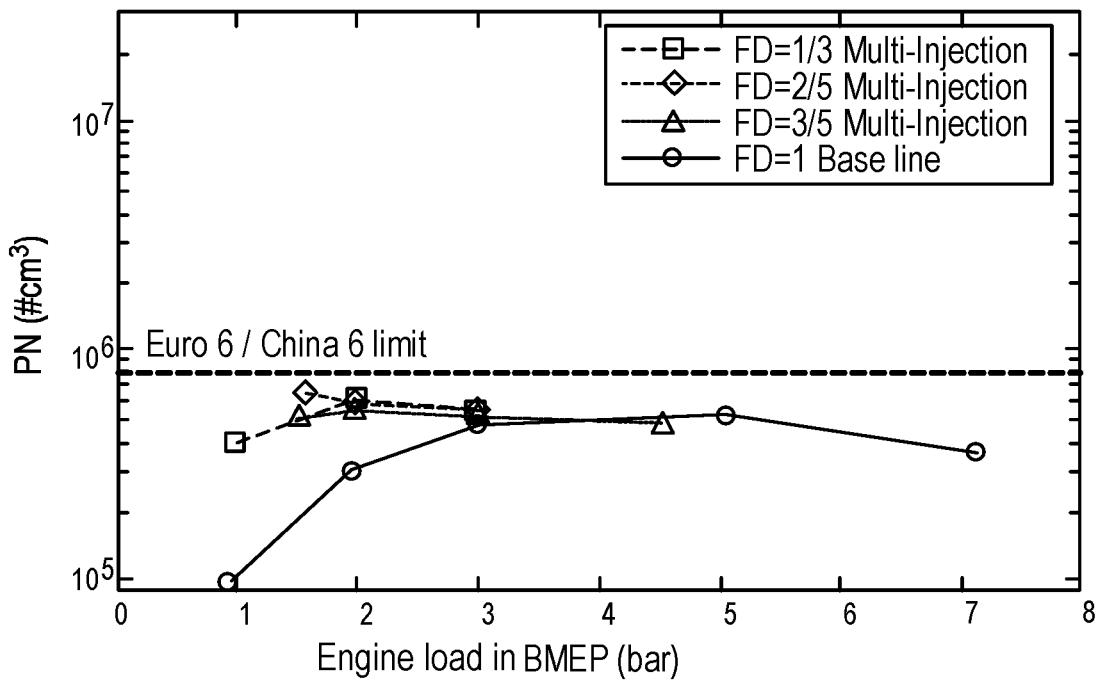
FIG. 10 is a plot of particulate emissions versus engine load for the same firing densities as shown in FIG. 9 with split fuel injection.

FIG. 10 shows PN emission at 1600 RPMs for the firing densities shown in FIG. 9 with split or equivalently multi-pulse injection. As shown in the figure, a multi-pulse injection strategy has been utilized to resolve the high PN emissions for FDs of ⅓, ⅖, and ⅗. In this experiment, one fuel mass injection during the intake stroke and one fuel mass injection occurred during the compression stroke. Comparison of the PN emissions shown in FIG. 9 with those shown in FIG. 10 demonstrates that the PN emissions for FDs of ⅓, ⅖, and ⅗ have been significantly reduced. The PN emission for a FD of ⅓ has been reduced by an order of magnitude with the use of multi-pulse injection. Even though the PN emissions of FDs of ⅓, ⅖, and ⅗ are still higher than in an all-cylinder mode, those FDs now meet the Euro 6c/China 6 PN emission regulations.

Figure 11:
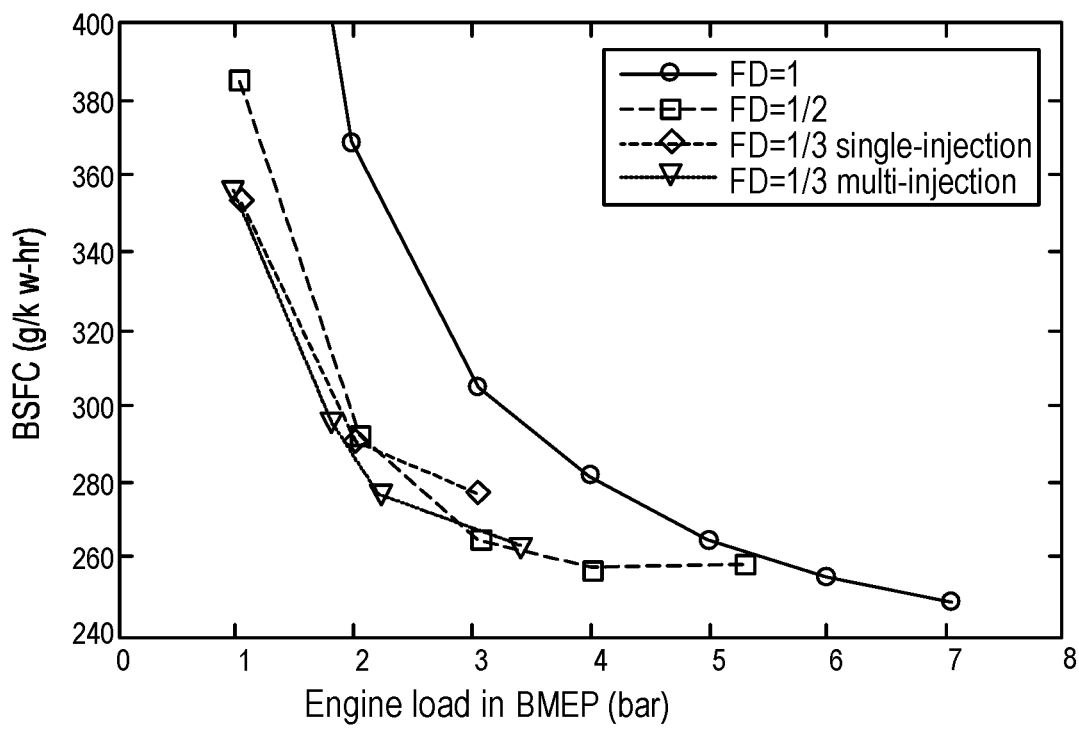
FIG. 11 is a plot of the BSFC versus engine load for several firing densities, some with split injection and some with single injection.

FIG. 11 illustrates Brake Specific Fuel Consumption (BSFC) vs. engine load at 1600 RPMs for various FDs. The FDs of ½ and 1 used single pulse injection. Data for a FD of ⅓ with both split and single pulse injection is shown. As evident in the FIG. 11, split injection for a FD of ⅓ has equal or reduced fuel consumption as compared to single pulse injection. In particular, FIG. 11 shows BSFC has been improved by approximately 3% for a FD of ⅓ at an engine load of 3 bar. The minimum BSFC crossover point between a FD of ⅓ and ½ has increased from approximately 2 to 3 bar. Multiple short injection sprays produce a more homogeneous air-fuel mixture than a long injection spray in a fired working cycle following multiple consecutive skipped working cycles. Therefore, both PN emission and fuel consumption have been reduced. This effect is more obvious at higher cylinder loads where longer injection durations lead to longer fuel pulse durations and longer spray penetration lengths.

Figure 12:
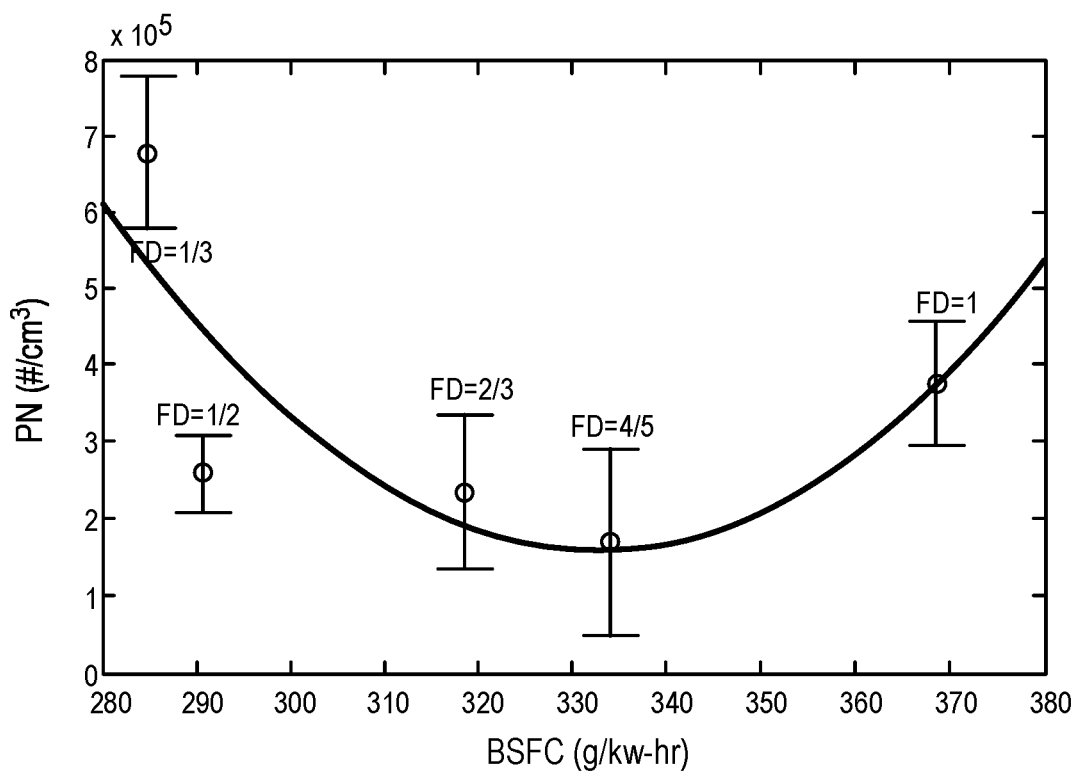
FIG. 12 is a plot of particulate emissions versus BSFC for various firing densities under a constant engine load.

FIG. 12 shows PN emission versus fuel consumption at 1600 rpm and 2 bar BMEP. As evident in the figure, there is a tradeoff between DSF PN emissions and fuel consumption. At a low brake torque output, smaller FDs have less pumping loss, so the BSFC is better as FD decreases. However, as cylinder load increases, the PN emissions also increase due to longer fuel injection durations. DSF has the capability to operate at any point on the PN/BSFC tradeoff curve. The data shown for a FD of ⅓ is with multi-pulse injection. All other data points are for single pulse injection.

During DSF operation, the FD is dynamically changing based on engine speed, load, torque demand, and transmission gear ratio. Therefore, it is also important to ensure that any PN emission spike during a FD transient is minimized. As mentioned earlier, reactivating a cylinder after two or more consecutive skipped cycles may produce high PN emissions in the test engine unless split injection is used.

Figure 13:
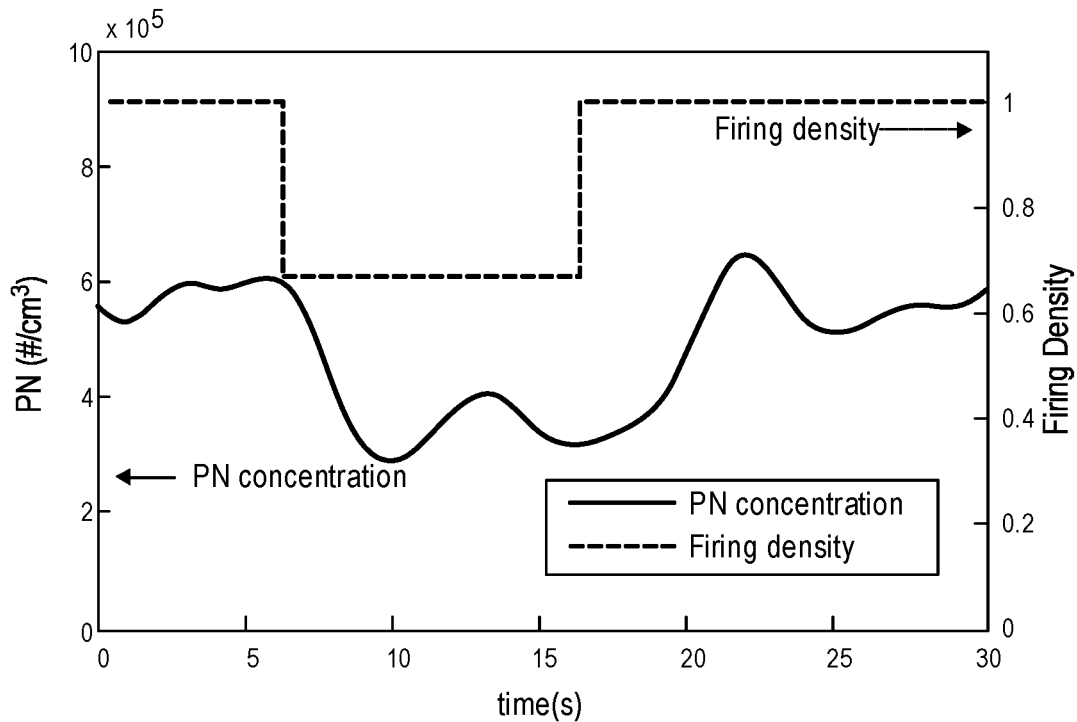
FIG. 13 is a plot of particulate emissions versus time through a firing density transition from 1 to 2/3 and back to 1 using single injection.

FIG. 13 shows PN emission during a firing density transition from a FD of 1 to a FD of ⅔ and back to a FD of 1 at an engine speed of 1600 rpm and an engine load of 4 bar BMEP. The FD history is shown by the upper dashed line. The PN emission is reduced during operation at a FD of ⅔ and no PN spikes occur during the transition into or out of a FD of ⅔. Single pulse fuel injection is used throughout the transition. FD of ⅔ is a pattern where a given cylinder is skipped once and fired twice. The cylinder temperature does not drop significantly enough to cause a PN spike with single injection.

Figure 14:
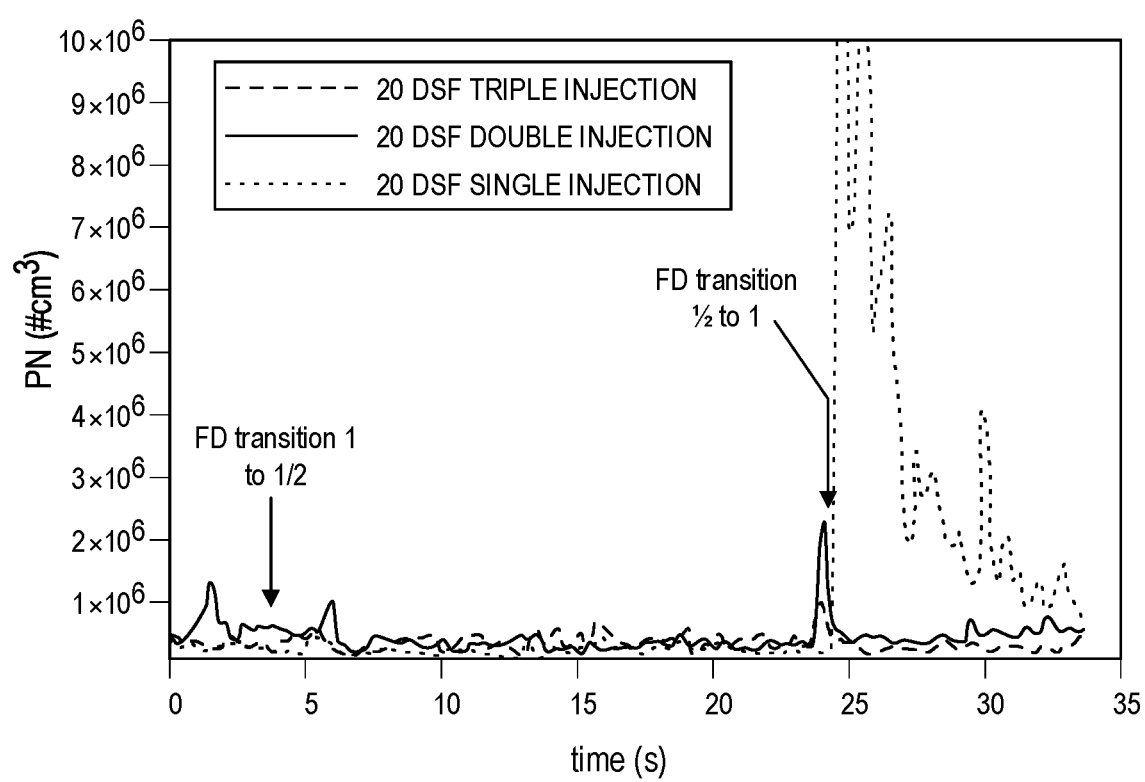
FIG. 14 is a plot of particulate emissions versus time through a firing density transition from 1 to 1/2 and back to 1 using single pulse injection, double pulse injection, and triple pulse injection.

While the transition from a firing density of 1 to ⅔ and back to 1 shown in FIG. 13 has no PN emission spike, a PN emission spike has been observed during certain exits from a fixed firing pattern. For example, FIG. 14 shows the PN emission characteristics when transitioning from a FD of 1 to a FD of ½ and back to a FD of 1 at an engine speed of 1600 RPM and a cylinder load of 2.5 bar BMEP. The figure illustrates three different fuel injection strategies: single pulse, double pulse, and triple pulse. In FIG. 14 the transition from a firing density of 1 to a firing density of 2 occurs at approximately 4 seconds. The transition from a firing density of ½ to a firing density of 1 occurs 20 seconds later, at approximately 24 seconds.

The most obvious attribute of FIG. 14 is the large PM emission spike associated with the FD transition from ½ to 1 when using single pulse fuel injection. The PN emission spike exceeds $10.0 \times 10^6$ particles/cm$^3$ and increased PN emission is seen for more than 10 seconds after the firing density transition for single pulse injection. This large PN emission increase results from half of the engine's cylinders being deactivated for 20 seconds and thus they have significantly cooled. Generally, the presence and magnitude of any PN emission spike is dependent upon how long any given cylinder has been skipped. For shorter deactivated times, the PN emission spike is reduced. The PN emission is significantly reduced by using split injection. The PN spike can be reduced to about $2.5 \times 10^6$ particles/cm$^3$ with two-pulse injection or even further reduced to about $1.0 \times 10^6$ particles/cm$^3$ with three-pulse injection.

CONCLUSIONS

The impact of dynamic skip fire engine control on particulate emissions of an exemplary turbocharged gasoline direct fuel injected engine have been analyzed. The following results have been found:

For the same cylinder load on firing cylinders, operation at firing densities associated with dynamic skip fire control can have similar PN emission per cylinder.

For low engine torque output, DSF can operate firing cylinders at higher cylinder loads, reducing fuel consumption and particulate emissions at the same time.

Particulate emission spikes have not been observed during the entrance and exit of firing densities associated with some rotating pattern firing densities. Firing density transitions that reactivate cylinders that have been skipped in one or more immediately prior working cycles can exhibited particulate emission spikes. The presence and magnitude of any particulate emission spike is dependent upon how long any given cylinder has been skipped.

Split injection using multiple fuel pulses is very effective in reducing high particulate emissions for the reactivation cycle(s) of a skipped cylinder. In addition, split injection also helps fuel economy by improving air-fuel mixing during the reactivation cycle(s).

The invention has been described primarily in the context of controlling the firing of 4-stroke piston engines suitable for use in motor vehicles. However, it should be appreciated that the described skip fire approaches are very well suited for use in a wide variety of internal combustion engines. These include engines for virtually any type of vehicle— including cars, trucks, boats, construction equipment, aircraft, motorcycles, scooters, etc. and virtually any other application that involves the firing of working chambers and utilizes an internal combustion engine. The various described approaches work with engines that operate under a wide variety of different thermodynamic cycles—including virtually any type of two stroke piston engines, Diesel engines, Otto cycle engines, Dual cycle engines, Miller cycle engines, Atkinson cycle engines, Wankel engines and other types of rotary engines, mixed cycle engines (such as dual Otto and Diesel engines), radial engines, etc. It is also believed that the described approaches will work well with newly developed internal combustion engines regardless of whether they operate utilizing currently known, or later developed thermodynamic cycles.

Various theories related to cylinder cooling have been proposed to explain reduced PN emission at some firing densities using split fuel injection. It should be appreciated that the use of split injection to reduce PN emission does not rely on these theories being correct and other explanations for the observations are possible. The present embodiments should be considered illustrative and not restrictive and the invention is not to be limited to the details given herein but may be modified within the scope and equivalents of the appended claims.

What is claimed is:

1. A vehicle, comprising:
    an internal combustion engine having a cylinder;
    a direct fuel injector; and
    an engine controller configured to:
    (a) deactivate the cylinder and operating the cylinder as a Low Pressure Exhaust Spring (LPES) during a first working cycle;
    (b) activate the cylinder during a second working cycle that follows the first working cycle; and
    (c) direct the direct fuel injector to directly inject two or more pulses of fuel into the cylinder during the second working cycle, the engine controller making a decision to direct the fuel injector to directly inject the two or more pulses of fuel during the second working cycle at least partially based on a cooling profile of the cylinder while operated as the LPES type gas spring, wherein the direct injection of the two or more pulses reducing particulate emissions compared to the direct injection of a single pulse of fuel.

2. The vehicle of claim 1, wherein the engine controller further makes the decision to direct the direct fuel injector to directly inject the two or more pulses at least partially based on a firing history of the cylinder.

3. The vehicle of claim 1, wherein the engine controller further makes the decision to direct the direct fuel injector to directly inject the two or more pulses during the second working cycle at least partially based on whether a temperature of the cylinder is below a threshold temperature.

4. The vehicle of claim 3, wherein the engine controller is further arranged to direct the direct fuel injector to directly inject the two or more pulse into the cylinder during one or more active working cycles, following the second working cycle, until the temperature of the cylinder exceeds the threshold temperature.

5. The vehicle of claim 4, wherein the engine controller is further arranged to direct the direct fuel injector to directly inject only a single pulse into the cylinder during a subsequent active working cycle, following the one or more active working cycles, when the temperature of the cylinder exceeds the threshold temperature.

6. The vehicle of claim 1, wherein the second working cycle includes an intake stroke, a compression stroke, and a power stroke and a first fuel pulse of the two or more fuel pulses is directly injected during the intake stroke and a second fuel pulse of the two or more fuel pulses are directly injected during either the intake stroke, the compression stroke, or the power stroke.

7. The vehicle of claim 1, wherein the internal combustion engine includes multiple cylinders and multiple direct fuel injectors respectively,
    wherein the engine controller is configured to selectively direct the multiple direct fuel injectors to directly inject either one pulse of fuel or the two or more pulses of fuel during active working cycles following deactivated work cycles for each of the multiple cylinders respectively.

8. The vehicle of claim 1, wherein the engine controller is a dynamic skip fire engine controller that is configured to dynamically activate or deactivate multiple cylinders of the internal combustion engine, on a firing opportunity by firing opportunity basis, to meet varying torque demands during driving of the vehicle.

9. The vehicle of claim 1, wherein the engine controller is a multi-level skip fire engine controller that is configured to modulate torque outputs of multiple cylinders of the internal combustion engine to have different torque output levels.

10. The vehicle of claim 1, wherein the internal combustion engine includes multiple cylinders and the engine controller is further arranged to direct the direct fuel injector to inject two or more pulses of fuel into all reactivated cylinders of the internal combustion engine when exiting a deceleration cylinder cut-off (DCCO) mode.

11. The vehicle of claim 1, wherein the cylinder was deactivated on a working cycle immediately preceding the first working cycle such that the cylinder was deactivated at least two working cycles immediately precede the second working cycle.

12. A method of operating an internal combustion engine of a vehicle comprising:
    deactivating a cylinder of the internal combustion engine during a first firing opportunity;
    operating the deactivated cylinder as a Low Pressure Exhaust Spring (LPES) type gas spring during the first firing opportunity when the cylinder is deactivated;
    reactivating the cylinder during a second firing opportunity that follows the first firing opportunity;
    deciding to inject either one pulse of fuel or split injecting at least two pulses of fuel into the reactivated cylinder during a working cycle that corresponds to the second firing opportunity, the decision at least partially based on a cooling profile of the cylinder while operated as the LPES type gas spring; and directly injecting the at least two pulses of fuel into the reactivated cylinder based on the decision if the cooling profile indicates that the reactivated cylinder has sufficiently cooled, wherein the direct injection of the two pulses reducing particulate emissions relative to directly injecting only the one pulse of fuel.

13. The method of claim 12, wherein any decision for the split injecting of the at least two pulses of fuel into the reactivated cylinder further comprises injecting a first fuel pulse of the two or more fuel pulses during an intake stroke and injecting a second fuel pulse of the two or more fuel pulses during either the intake stroke, a compression stroke, or a power stroke.

14. The method of claim 12, further comprising:
(a) ascertaining an operating temperature of the reactivated cylinder; and
(b) split injecting the at least two pulses of fuel into the reactivated cylinder during the working cycle if the operating temperature is below a threshold temperature,
wherein the ascertaining of the operating temperature of the reactivated cylinder is at least partially based on the cooling profile of the cylinder while operated as the LPES type gas spring.

15. The method of claim 14, further comprising repeating (a) and (b) during one or more subsequent active working cycles, following the reactivated working cycle, until the determined operating temperature exceeds the threshold temperature.

16. The method of claim 15, further comprising, after the determined operating temperature exceeds the threshold temperature, injecting a single pulse of fuel into the reactivated cylinder during the one or more subsequent active working cycles.

17. The method of claim 12, further comprising operating the internal combustion engine in a dynamic skip fire mode wherein the cylinder is dynamically either activated or deactivated, on a firing opportunity by firing opportunity basis, to meet varying torque demands during driving of the vehicle.

18. The method of claim 12, further comprising operating the internal combustion engine in a dynamic multi-level skip fire mode wherein multiple cylinders are modulated to have different torque outputs while operating at a select effective reduced displacement that is less than full displacement of the internal combustion engine.

19. The method of claim 12, further comprising split injecting at least two pulses of fuel into all reactivated cylinders of the internal combustion engine after exiting a deceleration cylinder cut-off (DCCO) mode.

20. The method of claim 12, further comprising deactivating the cylinder during a prior firing opportunity before the first firing opportunity.

21. An engine controller configured to operate an internal combustion engine having a plurality of cylinders, the engine controller configured to decide to:
(a) deactivate a cylinder on some working cycles and activate the cylinder on other working cycles: and
(b) operate the cylinder during at least some of the deactivated working cycles as one of a Low Pressure Exhaust Spring (LPES) type gas spring;
(c) direct either single or split injection of fuel into the cylinder during activate working cycles;
wherein the decision whether to use split injection for a given active working cycle is based at least in part on if the cylinder has cooled in temperature due to the cylinder being deactivated and being operated as the LPES type gas spring during one or more previous working cycles such that an operating temperature of the cylinder has dropped to less than a threshold temperature, wherein the split injection helps reduce particulate emissions compared to using the single injection of the fuel.

22. The engine controller of claim 21, wherein the decision to use split injection for the given work cycle is further based at least in part on the firing history of the cylinder.

23. The engine controller as recited in claim 21, further configured to operate the internal combustion engine in one or more reduced displacement modes, each of which is/are less than full displacement of the internal combustion engine, wherein the one or more reduced displacement modes are implemented by one of the following:
(a) deactivating a group of one or more of the plurality of cylinders;
(b) operating the internal combustion engine in a dynamic skip fire mode where a decision to either deactivate or activate each of the plurality of cylinders is made on a firing opportunity by firing opportunity basis; or
(c) a dynamic multi-level skip fire mode wherein the output of each activated cylinder is selected from one of several different output levels.

24. A method of controlling an internal combustion engine having a cylinder, the cylinder using direct fuel injection, the method comprising;
operating the internal combustion engine so that the cylinder is skipped and operates as a Low Pressure Exhaust Spring (LPES) type gas spring on some working cycles and fired on other working cycles; and
during the fired working cycles:
using a first fuel injection pattern to inject fuel into the cylinder during a first subset of the fired working cycles; and
using a second fuel injection pattern to inject fuel into the cylinder during a second subset of the fired working cycles, the second fuel injection pattern being different than the first fuel injection pattern,
wherein a decision to use the first fuel injection pattern or the second fuel injection pattern is at least partially based on a cooling profile of the cylinder if operated as the LPES type air spring in one or more previous working cycles in which the cylinder was skipped.

25. The method as recited in claim 24, wherein the first fuel injection pattern has fewer pulses of fuel than the second fuel injection pattern.

26. The method as recited in claim 25, wherein the first fuel injection pattern has a single pulse of injected fuel and the second fuel injection pattern has multiple pulses of injected fuel.

27. The method as recited in claim 25, wherein the second fuel injection pattern is used on fired working cycles immediately following skipped working cycles.

28. The method as recited in claim 25, wherein the second fuel injection pattern is used on fired working cycles immediately following skipped working cycles and for a number of consecutive fired working cycles thereafter.

29. The method as recited in claim 25, wherein the second fuel injection pattern is used on fired working cycles immediately following two or more successive skipped working cycles.

30. The method as recited in claim 25, wherein the decision to use the first fuel injection pattern or the second fuel injection pattern is also based at least in part on a firing history of the cylinder.

31. The method as recited in claim 25, wherein the decision to use the first fuel injection pattern or the second fuel injection pattern is also based at least in part on a speed and a load of the internal combustion engine.

32. The method as recited in claim 25, wherein the decision to use the first fuel injection pattern or the second fuel injection pattern is also based at least in part on a temperature of the cylinder, wherein the second fuel injection pattern is selected when the temperature of the cylinder is below a threshold temperature.

33. The method as recited in claim 25, wherein the internal combustion engine is a Diesel engine or a gasoline engine.

\* \* \* \* \*